United States Patent
Bosworth

(10) Patent No.: US 10,875,662 B2
(45) Date of Patent: Dec. 29, 2020

(54) METHOD OF ROBOT MANIPULATION IN A VIBRATION ENVIRONMENT

(71) Applicant: Aurora Flight Sciences Corporation, Manassas, VA (US)

(72) Inventor: William Bosworth, Cambridge, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 299 days.

(21) Appl. No.: 15/957,529

(22) Filed: Apr. 19, 2018

(65) Prior Publication Data

US 2019/0322384 A1   Oct. 24, 2019

(51) Int. Cl.
  *B64D 45/00*  (2006.01)
  *G05D 1/10*  (2006.01)
  *G05D 1/00*  (2006.01)
  *G07C 5/08*  (2006.01)

(52) U.S. Cl.
  CPC ....... *B64D 45/0005* (2013.01); *G05D 1/0088* (2013.01); *G05D 1/101* (2013.01); *G07C 5/085* (2013.01); *B64D 2045/0085* (2013.01); *G05B 2219/37435* (2013.01); *G05B 2219/39024* (2013.01)

(58) Field of Classification Search
  CPC ........ B64D 45/0005; B64D 2045/0085; G05D 1/101; G05D 1/0088; G05D 1/0094; G07C 5/085; G05B 2219/39024; G05B 2219/37435; B25J 15/0095; B25J 11/00
  See application file for complete search history.

(56) References Cited

U.S. PATENT DOCUMENTS

| | | | |
|---|---|---|---|
| 4,063,073 | A | 12/1977 | Strayer |
| 5,157,615 | A | 10/1992 | Brodegard et al. |
| 5,283,643 | A | 2/1994 | Fujimoto |
| 6,480,152 | B2 | 11/2002 | Lin et al. |
| 6,604,044 | B1 | 8/2003 | Kirk |
| 6,820,006 | B2 | 11/2004 | Patera |

(Continued)

FOREIGN PATENT DOCUMENTS

| | | |
|---|---|---|
| EP | 2251851 | 11/2010 |
| WO | WO 2016/035002 | 3/2016 |

OTHER PUBLICATIONS

Extended European Search Report, dated Dec. 13, 2018, in European application No. 18183666.9.

(Continued)

*Primary Examiner* — Mary Cheung
(74) *Attorney, Agent, or Firm* — Michael Stanley Tomsa; McAndrews, Held & Malloy, Ltd.; Eugene H. Nahm

(57) ABSTRACT

A method of operating a manipulation system of the type having a movable arm with a proximal end connected to a base and a distal end that is movable relative to the base and is coupled to an end-effector. The method comprises moving the distal end of the movable arm towards a target object and into contact with a stabilization object proximate to the target object, maintaining contact between the distal end of the movable arm and the stabilization object while operating the end-effector to perform a desired operation at the target object, and upon completing the desired operation at the target object, disengaging the distal end of the movable arm from contact with the stabilization object.

21 Claims, 10 Drawing Sheets

(56) References Cited

U.S. PATENT DOCUMENTS

| | | | |
|---|---|---|---|
| 6,993,420 | B2 | 1/2006 | Le Draoullec et al. |
| 7,106,219 | B2 | 9/2006 | Pearce |
| 7,176,830 | B2 | 2/2007 | Horibe |
| 7,193,729 | B1 | 3/2007 | Li |
| 7,203,630 | B2 | 4/2007 | Kolb et al. |
| 7,437,220 | B2 | 10/2008 | Stefani |
| 7,624,943 | B2 | 12/2009 | Cerchie et al. |
| 7,650,232 | B1 | 1/2010 | Paielli |
| 7,784,741 | B2 | 8/2010 | Cerchie et al. |
| 7,848,698 | B2 | 12/2010 | Batcheller et al. |
| 7,954,965 | B1 | 6/2011 | Boyd et al. |
| 8,026,827 | B1 | 9/2011 | Boyd et al. |
| 8,049,658 | B1 | 11/2011 | Lagonik et al. |
| 8,052,096 | B2 | 11/2011 | Cerchie et al. |
| 8,290,638 | B2 | 10/2012 | Eicke et al. |
| 8,306,672 | B2 | 11/2012 | Nickolaou |
| 8,319,665 | B2 | 11/2012 | Weinmann et al. |
| 8,319,666 | B2 | 11/2012 | Weinmann et al. |
| 8,346,480 | B2 | 1/2013 | Trepagnier et al. |
| 8,373,751 | B2 | 2/2013 | Han et al. |
| 8,411,145 | B2 | 4/2013 | Fardi |
| 8,466,827 | B2 | 6/2013 | Nanami |
| 8,504,223 | B2 | 8/2013 | Boorman et al. |
| 8,616,883 | B2 | 12/2013 | Wokurka |
| 8,616,884 | B1 | 12/2013 | Lechner et al. |
| 8,768,534 | B2 | 7/2014 | Lentz |
| 9,052,393 | B2 | 6/2015 | Kriel et al. |
| 9,097,801 | B2 | 8/2015 | Kambe et al. |
| 9,202,098 | B2 | 12/2015 | Lewis et al. |
| 9,507,021 | B2 | 11/2016 | Lynam |
| 10,059,001 | B2 * | 8/2018 | Miyazawa ............ B25J 9/1697 |
| 2002/0004695 | A1 | 1/2002 | Glenn et al. |
| 2005/0151025 | A1 | 7/2005 | Mendelson et al. |
| 2007/0236366 | A1 | 10/2007 | Gur et al. |
| 2007/0270685 | A1 * | 11/2007 | Kang ................... A61B 90/03 600/424 |
| 2008/0316010 | A1 | 12/2008 | Chang |
| 2009/0105880 | A1 * | 4/2009 | Okazaki ................ B25J 9/1633 700/258 |
| 2009/0198392 | A1 | 8/2009 | Eicke et al. |
| 2009/0295602 | A1 | 12/2009 | Cernasov et al. |
| 2011/0149067 | A1 | 6/2011 | Lewis et al. |
| 2011/0160950 | A1 | 6/2011 | Naderhirn et al. |
| 2011/0171611 | A1 | 7/2011 | Batcheller et al. |
| 2011/0288773 | A1 | 11/2011 | Hoy |
| 2013/0090764 | A1 * | 4/2013 | Summer ............... G05D 1/0016 700/260 |
| 2013/0101090 | A1 * | 4/2013 | Schubert ............. G01N 23/203 378/87 |
| 2014/0080099 | A1 | 3/2014 | Sowadski et al. |
| 2014/0210648 | A1 | 7/2014 | Samuthirapandian et al. |
| 2014/0228859 | A1 * | 8/2014 | Smith ................... A61B 1/018 606/130 |
| 2015/0094982 | A1 | 4/2015 | Dupont De Dinechin |
| 2015/0127141 | A1 * | 5/2015 | Kawada ................ B25J 13/085 700/206 |
| 2015/0323932 | A1 | 11/2015 | Paduano et al. |
| 2015/0335388 | A1 * | 11/2015 | Iida ....................... A61B 34/37 606/130 |
| 2015/0339929 | A1 | 11/2015 | Hedrick et al. |
| 2015/0343634 | A1 * | 12/2015 | Kiyosawa ............ B25J 15/0253 700/228 |
| 2016/0019793 | A1 | 1/2016 | Fournier et al. |
| 2016/0124429 | A1 | 5/2016 | Schultz |
| 2016/0264254 | A1 | 9/2016 | Jajur et al. |
| 2016/0275802 | A1 | 9/2016 | Loegering |
| 2016/0361125 | A1 * | 12/2016 | Balicki .................. B25J 19/06 |
| 2017/0084183 | A1 | 3/2017 | Knox |
| 2017/0267331 | A1 | 9/2017 | Schultz |
| 2017/0277185 | A1 * | 9/2017 | Duda .................... G05D 1/101 |
| 2018/0001476 | A1 * | 1/2018 | Tan ......................... B61G 7/04 |
| 2018/0111266 | A1 * | 4/2018 | Okada .................. B25J 13/085 |
| 2018/0126551 | A1 * | 5/2018 | Amano ................. B25J 9/1612 |
| 2018/0253516 | A1 * | 9/2018 | Shimano .............. B25J 9/1669 |

OTHER PUBLICATIONS

The partial European search report in European application No. 18184925.8, dated Jan. 30, 2019.

Szondy, David: "DARPA robot lands (simulated) Boeing 737" (May 18, 2017), XP002787446, https://newatlas.com/darpa-robot-boeing-737-landing-simulator/49580/ [retrieved on Dec. 14, 2018].

Aurora Flight Sciences: "Robotic Co-Pilot Flies and Lands a Simulated Boeing 737" (May 16, 2017), XP054978975, https://www.youtube.com/watch?v=om18cOWFL3Q [retrieved on Dec. 14, 2018].

Aurora: "Alias Advanced Automation to Enable Reduced Crew Operations Aircrew Labor In-Cockpit Automation System Artist's Concept", (Oct. 15, 2016), XP055534900, http://www.aurora.aero/wp-content/uploads/2016/10/ALIAS-Brochure_X8.pdf [retrieved on Dec. 14, 2018].

"AI Just "Landed" a Boeing 737 for the First Time by Itself" (Jun. 28, 2017) https://bigthink.com/robby-berman/ai-just-landed-a-boeing-737-for-the-first-time-by-itself [retrieved on Dec. 3, 2018].

"Answer: Fly your plane; Question: Who or what is CARNAC?" (Jun. 22, 2017), https://www.therobotreport.com/answer-fly-your-plane-question-who-or-what-is-carnac/ [retrieved on Dec. 3, 2018].

"Inside Darpa's Plan to Make Old Aircraft Autonomous With Robot Arms" (Feb. 11, 2016), https://www.wired.com/2016/11/darpa-alias-autonomous-aircraft-aurora-sikorsky/ [retrieved on Dec. 3, 2018].

"Pilotless planes may be landing at airports by 2020" (Dec. 6, 2016), https://www.geo.tv/latest/122825-Pilotless-planes-may-be-landing-at-airports-by-2020 [retrieved on Dec. 3, 2018].

""Siri, Land the Plane"" (May 26, 2017), https://www.airspacemag.com/daily-planet/meet-your-new-copilot-robotic-arm-180963469/ [retrieved on Dec. 3, 2018].

Extended European search report, in European application No. 18184925.8, dated Apr. 30, 2019.

Aurora Flight Sciences; Centaur Optionally-Piloted Aircraft brochure.

Day, Carole; Your (robot) captain speaking; The Australian Financial Review; Aug. 20, 2016.

Jeong, Heejin, et al.; A Robot-Machine Interface for Full-functionality Automation using a Humanoid; 2014 IEEE/RSJ International Conference on Intelligent Robots and Systems (IROS 2014); Sep. 14-18, 2014, Chicago, IL.

Markoff, John; A Machine in the Co-Pilot's Seat; The New York Times; Jul. 20, 2015.

International Search Report and Written Opinion, dated Jun. 21, 2017, in International application No. PCT/US2017/023523, filed Mar. 22, 2017.

* cited by examiner

METHOD OF ROBOT MANIPULATION IN A VIBRATION ENVIRONMENT

TECHNICAL FIELD

This present invention generally manipulation and control of robot, and, more specifically, to manipulation and control of robotic arms in vibration environments.

BACKGROUND

Robotic arms have proven to operate accurately around the clock with limited supervision (typically requiring little operator interaction after initial programming). Over the recent decades, robotic automation has evolved to enable highly reliable, millimeter-precision pick-up and placement of workpieces using a robotic arm. While robotic arms have evolved to be highly reliable and efficient, their precision can be adversely affected in any environment where the robot may be subject to vibration. Examples of environments the robotic arm can be affected by vibration include robot manipulation inside a vehicle traveling on a bumpy road, robotic manipulation inside an aircraft cockpit which is flying in turbulence, and/or robotic manipulation system attached to unmanned aerial vehicles (UAV).

Vibration at the base of the robotic arm can induce vibrations throughout the structure of the arm, which can adversely affect the positional accuracy of the robotic arm. Very large vibrations may also lead to high mechanical stress in the robot arm, which can lead to component failure. The effect of vibration is increased as the robotic arm is longer, for example if the robotic arm is reaching out to the edge of its workspace. A longer arm (or arm pose) is more affected by floating base vibration due to the following: (a) the arm's moment of inertia I, which scales a mass m and length r scales as $I \sim mr^2$ and (b) Rotational motion (d_theta) at the "shoulder" of the arm will cause a linear displacement at the finger of the arm (d_x) at $d\_x \sim d\_theta*r$. Robotic arms may be configured to serve as human collaborative robot arms ("co-bots") in environments with large vibrations, such as in an aircraft that is operating in high turbulence.

Accordingly, a need exists for a method of reducing the effects of vibration on the positional accuracy of a robotic arm. The system and method can address how the vibration environment reduces the fidelity of the human-safety systems built into many robot arms (e.g., articulating arm 202).

SUMMARY OF THE INVENTION

Disclosed herein are methods and systems for reducing effect of vibration on the accuracy of robotic arms.

According to a first aspect, in a manipulation system having a movable arm, the movable arm having a proximal end connected to a base and a distal end that is movable relative to the base, the movable arm being coupled to an end-effector, a method of operating the manipulation system comprises: moving the distal end of the movable arm towards a target object and into contact with a stabilization object proximate to the target object; maintaining contact between the distal end of the movable arm and the stabilization object, while operating the end-effector to perform a desired operation at the target object; and upon completing the desired operation at the target object, disengaging the distal end of the movable arm from contact with the stabilization object.

In certain aspects, the movable arm is an articulating arm having at least two linkages that are movably connected to one another via a joint.

In certain aspects, the end-effector is movably coupled to the movable arm via an articulating appendage, thereby enabling the end-effector to move relative to the movable arm.

In certain aspects, the method further comprises releasably anchoring the distal end of the articulating arm to the stabilization object while the end-effector performs a desired operation at the target object.

In certain aspects, the desired operation comprises manipulating a movable object at the target object.

In certain aspects, the movable object is a flight controller in the cockpit having at least one of a button, a lever, or a knob.

In certain aspects, the method further comprises sensing an engagement pressure between the distal end of the movable arm and the stabilization object.

In certain aspects, the method further comprises providing a docking station at the stabilization object, the docking station being configured to engage releasably with the distal end of the movable arm.

In certain aspects, the docking station comprises a funnel shaped object configured to receive releasably the distal end.

In certain aspects, the stabilization object is fixed against movement relative to the target object.

In certain aspects, the stabilization object is physically connected with the target object.

In certain aspects, the stabilization object and the base are both physically connected to the same object.

In certain aspects, the stabilization object and the base are both physically connected to a surface in a cockpit or an aircraft frame.

In certain aspects, the stabilization object is physically connected to the target object.

In certain aspects, the method further comprises the step of distinguishing vibration imparted to the manipulation system via the surface from vibration originating from other parts of the manipulation system based at least in part on accelerometer data from one or more accelerometers placed on the manipulation system.

In certain aspects, the safety process pauses operation of the manipulation system.

According to a second aspect, in a manipulation system installed on a vibrating surface, the manipulation system comprising a movable arm having a proximal end connected to a base and a distal end movable relative to the base, one or more arm actuators configured to move the movable arm relative to the base, an end-effector coupled to the movable arm, an end-effector actuator configured to control an operation of the end-effector to perform a desired operation on a target object, the base and the target object fixed to the vibrating surface such that they are caused to vibrate by the vibrating surface, and a processor configured to control operation of the end-effector actuator and the one or more arm actuators, a method of improving a pointing-accuracy comprises: controlling the one or more arm actuators, via the processor, to move the distal end of the movable arm towards a target object and into contact with a stabilization object located proximate to the target object to mechanically-ground the distal end to the stabilization object, wherein the stabilization object is fixed against vibration relative to the target object; controlling the one or more arm actuators and the end-effector actuator, via the processor, to maintain contact between the distal end of the movable arm and the stabilization object while operating the end-effector to perform a desired operation at the target object; and upon completing the desired operation at the target object, controlling the one or more arm actuators, via the processor, to disengage the distal end of the movable arm from contact with the stabilization object.

In certain aspects, the method further comprises releasably anchoring the distal end of the articulating arm to the stabilization object while the end-effector performs a desired operation at the target object.

In certain aspects, the desired operation comprises manipulating a movable object at the target object.

In certain aspects, the movable object is a flight controller in a cockpit having at least one of a button, a lever, or a knob.

In certain aspects, the manipulation system further comprises a pressure sensor and wherein the method further comprising the step of sensing an engagement pressure between the distal end of the articulating arm and the stabilization object via the pressure sensor.

In certain aspects, the method further comprises providing a docking station at the stabilization object, the docking station being configured to releasably engage with the distal end of the articulation arm.

In certain aspects, the stabilization object is fixed against movement relative to the target object.

In certain aspects, the stabilization object is physically connected with the target object.

In certain aspects, the stabilization object and the base are both physically connected to the same object.

In certain aspects, the stabilization object and the base are both physically connected to a stable surface in a cockpit or an aircraft frame.

In certain aspects, the stabilization object is physically connected to the target object.

In certain aspects, the method further comprises performing a safety process based at least in part on accelerometer data from one or more accelerometers reflecting a high-vibration environment.

In certain aspects, the safety process pauses operation of the manipulation system.

According to a third aspect, a manipulation system comprises: a movable arm having a proximal end connected to a base and a distal end movable relative to the base; one or more arm actuators configured to move the movable arm relative to the base; an end-effector in connection with the moveable arm via an articulating arm linked to the moveable arm; an end-effector actuator configured to control an operation of the end-effector to perform a desired operation on a target object; and a processor configured to control operation of the end-effector actuator and the one or more arm actuators, the processor further configured to: control the one or more arm actuators to move the distal end of the movable arm towards a target object and into contact with a stabilization object located proximate to the target object; control the one or more arm actuators and the end-effector actuator to maintain contact between the distal end of the movable arm and the stabilization object while operating the end-effector to perform a desired operation at the target object; and control the one or more arm actuators, upon completing the desired operation at the target object, to disengage the distal end of the movable arm from contact with the stabilization object.

In certain aspects, the processor is further configured to releasably anchor the distal end of the moveable arm to the stabilization object while the end-effector performs a desired operation at the target object.

In certain aspects, the movable object is a flight controller in a cockpit having at least one of a button, a lever, or a knob.

In certain aspects, the manipulation system further comprises a pressure sensor configured to sense an engagement pressure between the distal end of the moveable arm and the stabilization object.

In certain aspects, the stabilization object comprises a docking station configured to releasably engage with the distal end of the articulation arm.

In certain aspects, the stabilization object is fixed against movement relative to the target object.

In certain aspects, the stabilization object is physically connected with the target object.

In certain aspects, the stabilization object and the base are both physically connected to the same object.

In certain aspects, the stabilization object and the base are both physically connected to a surface in a cockpit or an aircraft frame.

In certain aspects, the stabilization object is physically connected to the target object.

In certain aspects, the base comprises one or more accelerometers.

In certain aspects, the processor is further configured to perform a safety process based at least in part on the accelerometer data.

In certain aspects, the processor is configured to pause operation of the manipulation system during the safety process.

BRIEF DESCRIPTION OF THE DRAWINGS

The foregoing and other objects, features, and advantages of the devices, systems, and methods described herein will be apparent from the following description of particular embodiments thereof, as illustrated in the accompanying figures, where like reference numbers refer to like structures. The figures are not necessarily to scale, emphasis instead is being placed upon illustrating the principles of the devices, systems, and methods described herein.

FIG. 5b illustrates a block diagram of an example aircraft control system for the VTOL UAV of FIG. 5a.

DETAILED DESCRIPTION

Figure 1:
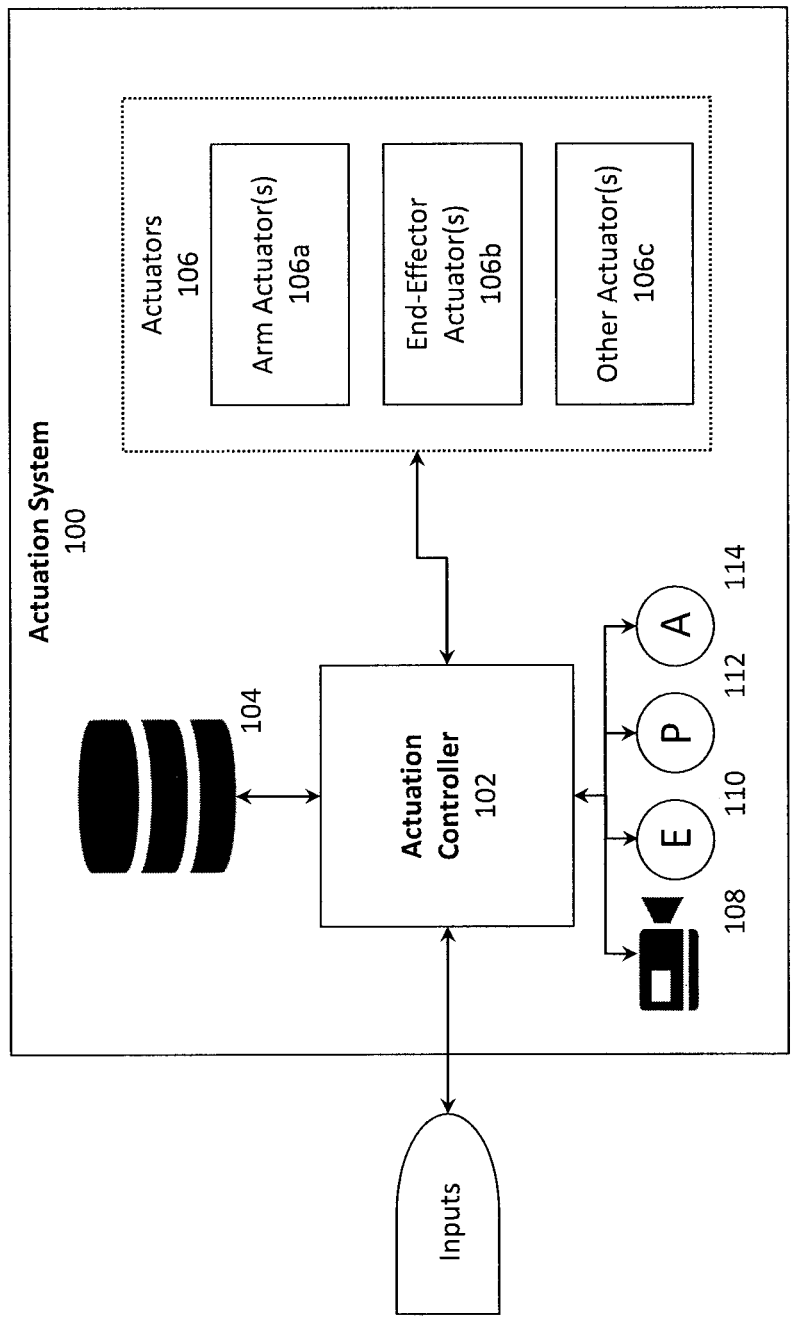
FIG. 1 illustrates a block diagram of an example actuation system.

Preferred embodiments of the present invention will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the invention in unnecessary detail. No language in the specification should be construed as indicating any unclaimed element as essential to the practice of the embodiments.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front," "back," and the like, are words of convenience and are not to be construed as limiting terms. The various data values (e.g., voltages, seconds, etc.) provided herein may be substituted with one or more other predetermined data values and, therefore, should not be viewed limiting, but rather, exemplary. For this disclosure, the following terms and definitions shall apply:

The terms "aerial vehicle" and "aircraft" refer to a machine capable of flight, including, but not limited to, fixed wing aircraft, unmanned aerial vehicle, variable wing aircraft, and vertical take-off and landing (VTOL) aircraft.

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "network" as used herein includes both networks and inter-networks of all kinds, including the Internet, and is not limited to any particular network or inter-network.

The term "processor" means processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with, a memory device.

Automation systems are becoming more readily deployed in the cockpit of aircraft. Such automation systems may be configured to, inter alia, manipulate an aircraft's flight controllers and to provide real-time information and/or feedback to the pilot. For example, Aurora Flight Sciences Corporation of Manassas, Va. ("Aurora") has previously developed a right-seat pilot assistant capable of operating a Diamond DA42 Twin Star during takeoff, cruise, and landing. The right-seat pilot assistant, called Centaur, can be installed into, and removed from, the DA42 without affecting the original type certificate, thus maintaining the aircraft's original certification. Centaur includes mechanical actuation of the primary flight controls and its own avionics suite, and may be used with a pilot in a supervisory role or as a fully unmanned aircraft. More recently, Aurora developed an aircraft state monitoring system with multiple actuation systems to manipulate flight controls to guide the flight and overall operation of the aircraft. The aircraft state monitoring system and its various actuation systems (e.g., manipulation systems) are described in greater details by commonly owned U.S. patent application Ser. No. 15/624,139 to William Bosworth et al., which was filed on Jun. 15, 2017 and is titled "System and Method for Performing an Emergency Descent and Landing."

Disclosed herein are a manipulation system and a method of operating the manipulation system, such as robotic arms, to reduce the negative effects that vibration has on pointing-accuracy of a robot. As will be discussed, improved pointing-accuracy can be accomplished by having the robot first contact a mechanical-grounding surface (e.g., a rigid or stable surface) at or near a target object (e.g., a manipulation target) before performing a manipulation on the target object. By contacting the mechanical-grounding surface, the robot can create a complete structural loop. By designing robots and their control systems to utilize intentional contact with a mechanically-ground structure in its environment, the pointing accuracy of the robot is increased by reducing the negative effects of vibration of floating base dynamics. In other words, when the robot reaches out to perform fine-manipulation of an object, it initially locates nearby mechanical-ground surfaces to anchor its endpoint, thereby limiting the negative effects that vibration would have on a cantilevered beam.

Manned aircraft cockpits are designed for the human reach envelope and, therefore, cockpit controls are reachable by a comparably sized robotic/mechanical manipulator. To more effectively achieve portability across aircraft, an automation system may separate the actuation of primary flight controls (stick/yoke, stick, side-stick or collective, rudder pedals, brakes, and throttles) from the actuation of secondary flight controls (e.g., switches, knobs, rockers, fuses, etc.) and the tertiary flight controls—the more complex interfaces in the cockpit, such as the flight management system (FMS) and its control display unit (CDU). This approach reduces the likelihood of designing a single point solution that becomes obsolete as aircraft evolve. Thus, the automation system may employ multiple manipulation systems to physically control the various flight controls and actuators in the cockpit; including all standard controls present on today's flight decks during flight operations. For example, one manipulation system may focus on actuating the primary flight controls (e.g., stick/yoke, stick, side-stick or collective, rudder pedals, breaks and throttles), while other manipulation systems may focus on actuating the controls that are not as easily, such as secondary flight controls (e.g., switches, knobs, rockers, fuses, etc.) and the tertiary flight controls, which typically exhibit more complex interfaces, such as keypads, small buttons, and other user actuable devices.

Figure 2A:
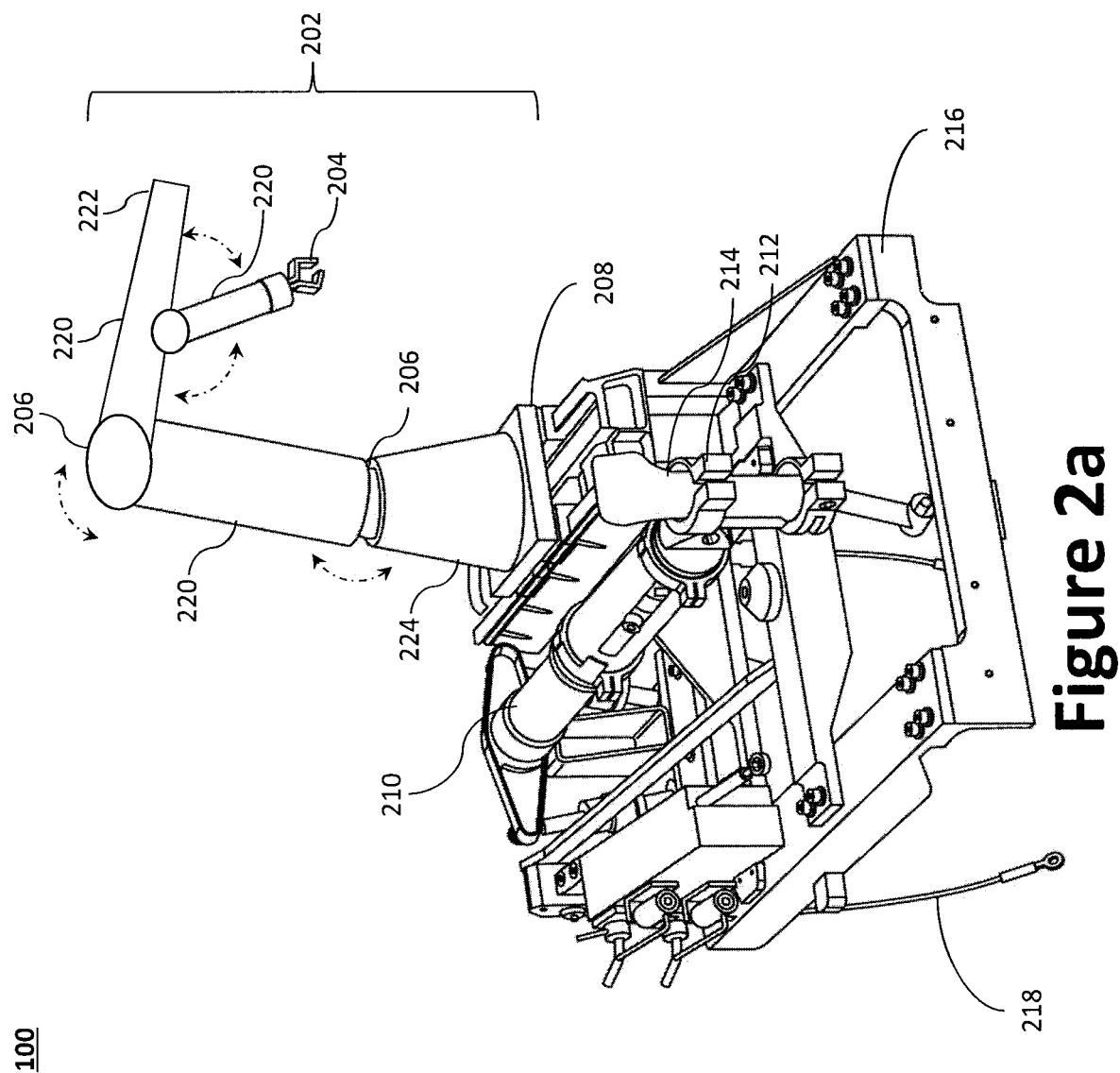
FIGS. 2a and 2b illustrate an example actuation system.
Figure 2B:
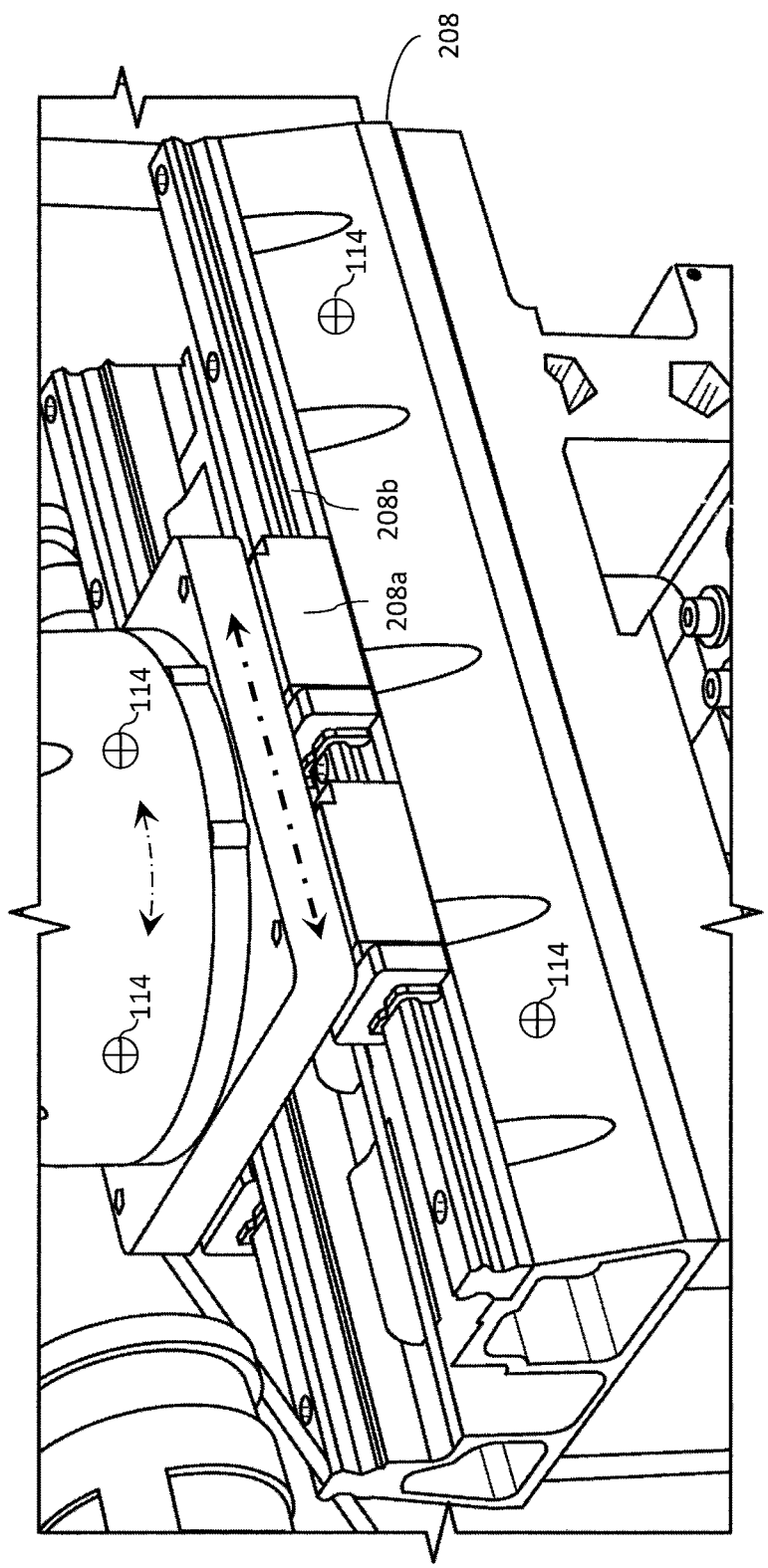

FIG. 1 illustrates a block diagram of an example robotic manipulation system 100, while FIGS. 2a and 2b illustrate an example robotic manipulation system 100 having a robotic arm configured to mount in an aircraft cockpit. The illustrated robotic manipulation system 100 may be configured to focus on the primary set of controls necessary to safely operate the aircraft.

As illustrated in FIG. 1, the robotic manipulation system 100 may comprise an actuation controller 102 that is operatively coupled with a memory device 104 having software and/or a database provided thereon, a plurality of actuators 106 to control an articulating arm, and one or more sensors to provide feedback, such as optical sensors 108 and positional feedback sensors, such as encoders 110, pressure sensors 112, and/or accelerometers 114. The plurality of actuators 106 may be one or more of linear (straight line), rotary (circular), or oscillatory actuators, which may be driven through one or more of electrical (e.g., via a motor), pneumatic, and/or hydraulic techniques. The actuation controller 102 may employ, for example, a processor and associated drive circuitry configured to receive and implement commands from an operator (e.g., human pilot) or a separate system (e.g., autopilot, automation system, etc.) and to provide feedback thereto. In other words, the actuation controller 102 may selectively control one or more actuators 106 to adjust the position of the articulating arm and/or end-effector based on information received from the operator, a separate control system, one or more sensors, and/or software and data stored to the memory device 104.

As shown in FIGS. 2a and 2b, a robotic manipulation system 100 may include a frame 216 having a moveable arm, which, in one aspect, can be an articulating arm 202 (e.g., a robotic appendage or "robotic arm"), and/or a stick/yoke actuator 210 to actuate various flight controls (yoke, stick, side-stick or collective, rudder pedals, brakes, and throttles) and other accessible controls. The frame 216 may be sized and shaped to fit within the seat of a standard aircraft (effectively replacing a human pilot). To that end, the frame's 216 footprint may be about the same size as, or smaller than, an average human's "seated" footprint. The robotic manipulation system 100 may be fabricated using lightweight metals, metal alloys, and/or composite materials.

The stick/yoke actuator 210 may couple to and engage the aircraft's existing stick/yoke 214 using a stick/yoke gripper 212. The stick/yoke gripper 212 may be sized and shaped such that it is universal and can engage various forms of stick/yokes and/or control wheels. The stick/yoke actuator 210 may be configured to move the stick/yoke 214 forward, backward, left, right, and intermediate positions therebetween. The stick/yoke gripper 212 may further comprise one or more actuators to actuate buttons and/or switches positioned on the stick/yoke 214.

The articulating arm 202 (or another form of movable arm) may be sized, shaped, and configured to occupy the space typically occupied by a co-pilot's arms, thereby ensuring portability across aircraft. To enable movement in multiple degrees of freedom ("DOF") movement, the articulating arm 202 may be actuator-controlled and comprise a plurality of arm segments 220 (whether linear, curved, angled, or a combination thereof) joined via a plurality of hinged or pivotal joints 206.

The articulating arm 202 may comprise an end-effector 204 (illustrated in FIG. 2a as a gripper) at, or near, the distal end 222 of the articulating arm's 202. Generally speaking, the end-effector 204 serves as the part of the manipulation system 100 that interacts with the controls (or other target) and the environment. Suitable end-effectors 320 for manipulation, transportation, and emplacement include rigid pointers, grippers, magnets, vacuum cups, etc. For example, where the manipulation system 100 needs to grab the controls (or other target), a gripper or an articulating robotic hand may be employed as an end-effector 204. Where the manipulation system 100 must perform other manufacturing operations, the end-effector 204 may include tools such as brushes, cutting tools, drills, sanders, screwdrivers, spray guns, and welding guns. The end-effector 204 may further include other devices to monitor the environment, such as anti-collision sensors (e.g., pressure sensors), cameras, etc.

In the illustrated example, the end-effector 204 may be movably coupled to the articulating arm 202 via a hinged or pivotal joint 206 and an arm segment 220. Accordingly, the end-effector 204 may move during operation relative to the articulating arm 202, while the articulating arm 202 may remain stationary. While a generally linear arm segment 220 is illustrated, other shapes are contemplated. For example, as will be described in connection with FIGS. 3a through 3d, the end-effector 204 may be coupled to the articulating arm 202 via an articulating appendage 354. Therefore, the end-effector 204 may be coupled to the articulating arm 202 via a multiple-DOF connection and configured to couple, or otherwise engage, for example, throttle levers, etc. Regardless of the configuration, the end-effector 204 may be configured to provide force and pressure detection to the actuation system 100 to allow an automation system to estimate how a flight control is grasped and to adjust the motion to properly manipulate the flight control. Once the motion is executed, the same feedback may be used to determine whether the desired switch configuration has been achieved. In certain aspects, the articulating arm 202 may be fitted with an electronic device (e.g., a homing device) that enables it to find and hit a target.

The proximal end 224 of the articulating arm 202 may be rotatable and slideably coupled to the frame 216 via a movable base 208. For example, the articulating arm 202 may be coupled with an upper base portion 208a, which is slideably coupled with a lower base portion 208b, which may be secured to the frame 216 that is coupled to a mechanical-grounding surface. The upper base portion 208a may slide relative to the lower base portion 208b using, for example, a combination of rails and ball bearings. In certain aspects, the upper base portion 208a may slide relative to the lower base portion 208b along both the X- and Y-axis.

The articulating arm 202 can be equipped with one or more encoders 110 (e.g., an 18-bit single-revolution rotational encoder) for each of its degrees of freedom to ensure exact positioning of the articulating arm 202. The encoders 110 can be mounted at an actuator 106, or at the hinged or pivotal joint 206 itself (e.g., down-stream of any gearbox or other linkage). Further, internal clutches may be provided at each hinged or pivotal joint 206 such that the articulating arm 202 can be overpowered by the pilot if so desired, without damaging the articulating arm 202. In such a case, the automation system may determine the position or location of the articulating arm 202 using the encoders 110.

The disclosed method can be beneficial in the context of aerial manipulation, including, for example, in the context of a robotic arm installed in an aircraft cockpit for controlling flight controls. In such applications, vibrations induced by turbulence, for example, may interfere with fine manipulation by the articulating arm 202, particularly when the articulating arm 202 is in an extended position. The disclosed method addresses this problem by engaging the distal end 222 of the articulating arm 202 with a robust mechanical-grounding surface, such a rigid surface or other frame, to stabilize the articulating arm 202 prior to and during the manipulation process.

As can be appreciated, a robotic manipulation system 100 may be configured to serve as a co-bot to humans in environments with large vibrations, such as in an aircraft cockpit subject to high turbulence. A feature of co-bots is its ability to detect inadvertent contact with the environment and to cease operation. The co-bot need not necessarily know what it has contacted, but the safety system assumes that the contact could be a human operator (e.g., a human pilot attempting to overpower/override the articulating arm 202).

A co-bot safety system, which may employ a safety process implemented via actuation controller 102 in conjunction with a memory device 104, can rely on force/torque sensors at each motor joint (e.g., encoders 110 and/or pressure sensor 112 positioned at joints 206). The force/torque sensor can take the form of strain gauges embedded into mechanical flexures, or the sensing can be performed by measuring the relationship between motor current and joint position/speed, possibly with the aid of calculation of the kinematic configuration of the robot arm. For example, though many possible instantiations may exist, the co-bot may be configured to perform an emergency stop if a measured (or calculated) force/torque exceeds a predetermined threshold value. That is, excessive joint torque at the joints 206 of the articulating arm 202 may result in the robotic manipulation system 100 entering a protective stop mode—a designation for an emergency stop.

In a high-vibration environment, however, accuracy of a co-bot safety system can be degraded where the vibration in the articulating arm 202 results in additional loads being impart onto the joints 206 of the articulating arm 202, which, in turn, can cause a protective stop to occur even when the articulating arm 202 has not made contact with the environment (i.e., a false positive). Accordingly, a designer is often faced with a choice of either accepting inadvertent protective stops caused by vibration, or increasing the threshold for a protective stop to limit the effect of vibration. The former can be time-consuming and a nuisance to the operator, while the latter can reduce the sensitivity and safety of the robot. Therefore, the disclosure presents a method for addressing the challenge of distinguishing external contact events from internal forces due to vibration.

In one aspect, the robotic manipulation system 100 may use accelerometers 114 to trigger a pause in the system functionality (e.g., cease movement/pause a current routine/ etc.). The accelerometer data (e.g., measurements) from the accelerometer(s) 114 may be used to enable the robotic manipulation system 100 to distinguish between loads induced by vibration and loads caused by inadvertent contact (e.g., with a human pilot). Indeed, multi-axis accelerometers 114 can be added to the base of the articulating arm 202, which can be used to trigger a pause to the operation of the robotic manipulation system 100. This eliminates the need to distinguish external contact from internal vibration-induced loading.

As illustrated in FIG. 2b, one or more accelerometers 114 may be mounted to the base of the robotic manipulation system 100. For example, a plurality of accelerometers 114 may be coupled to the frame 216 and/or movable base 208 (or portions thereof). The robotic manipulation system 100 may be provided with a robot safety-system (e.g., via actuation controller 102) that uses input from the accelerometer(s) 114 to distinguish external contact events from loading caused induced by the vibration. More broadly, accelerometers 114 may be used to refine dynamic models of the articulating arm 202, which could be used to distinguish external and internal loads. Based at least in part on the inputs from the accelerometer(s) 114, control of the robotic manipulation system 100 may be adjusted in one or more forms. In one example, control may be provided in the form of limiting the robotic manipulation system 100 to pause (or move more slowly) during vibration events. In another example, control may be provided in the form of filtering for specific vibration-induced frequencies. In yet another example, control may be provided in the form of complex dynamic modeling of the arm.

Therefore, an incremental method may be employed to aid the robotic manipulation system 100 in a vibration environment by, for example, coordinating the co-bot safety system with accelerometers 114 that are installed onto the frame 216 and/or movable base 208. The accelerometers 114 may be configured to measure, for example, all six translational and rotational accelerations. In one aspect, the articulating arm 202 of the robotic manipulation system 100 may be programmed not to operate during measured vibration (i.e., when the level of vibration reaching a predetermined threshold). Thus, no inadvertent protective stop could occur, which could be suitable for of non-time-critical tasks in intermittent vibration environments.

In scenarios where the robotic manipulation system 100 must operate during the vibration, the floating base accelerations must be combined with an accurate dynamic model of the articulating arm 202. Using a dynamic model of the articulating arm 202, which includes measurement of the external vibrations, the robotic manipulation system 100 may be able to measure contact through proprioceptive feedback, while also knowing which internal forces are caused by floating base dynamics. Rather than a complete dynamic model, another approach that may provide more fidelity than simply pausing the robotic manipulation system 100 if there are floating base vibrations is to filter force/torque joint data for vibration frequencies associated with floating base dynamics. Each joint 206 of the articulating arm 202 will have a characteristic resonance, which is the primary frequency that would be excited under noisy acceleration content—these frequencies should be filtered. Another method is to use external force sensors on the outside of the articulating arm 202.

Figure 3A:
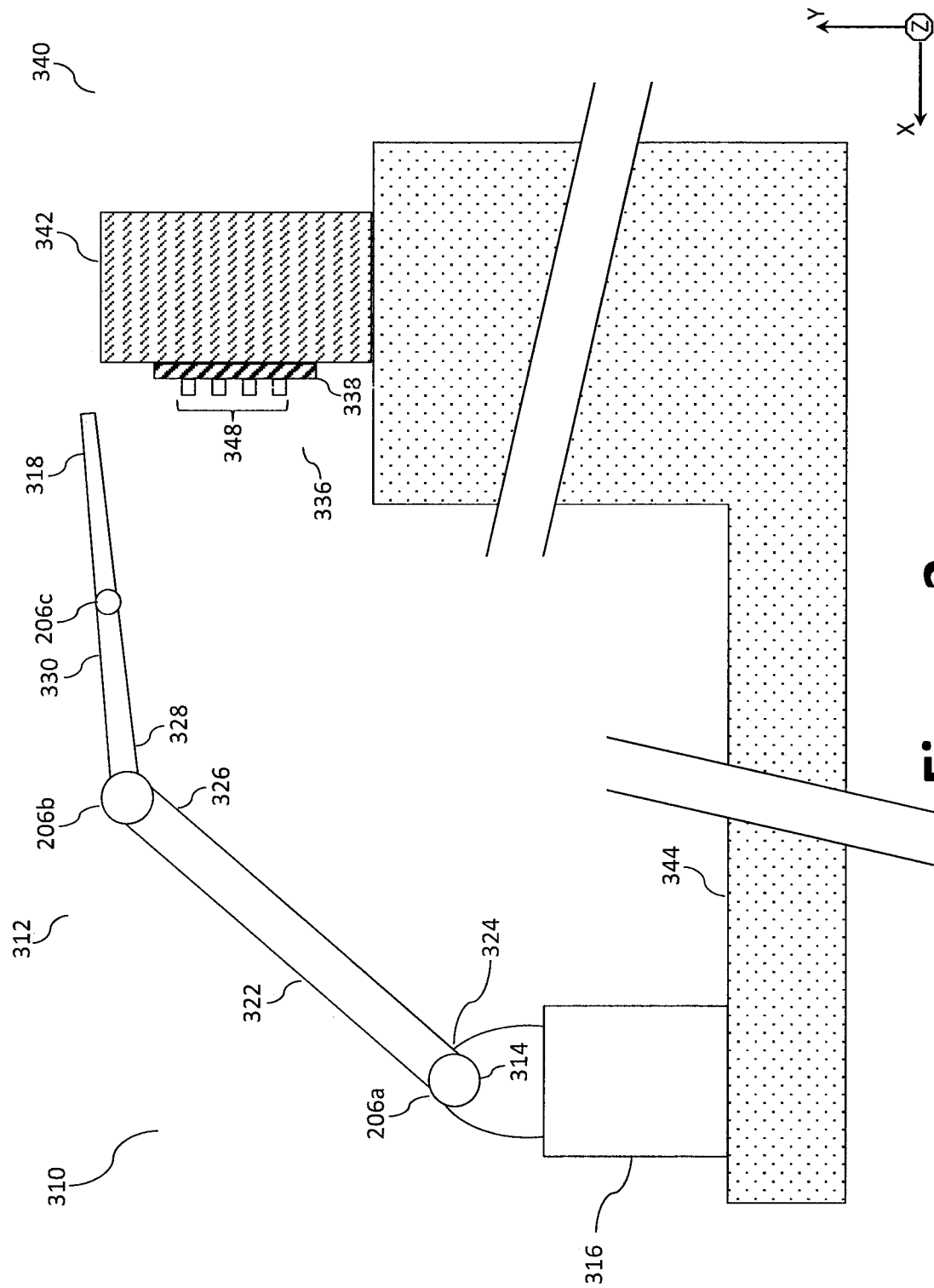
FIGS. 3a and 3b illustrate an example method for controlling a manipulation system in accordance with certain aspects of at least one embodiment.
Figure 3B:
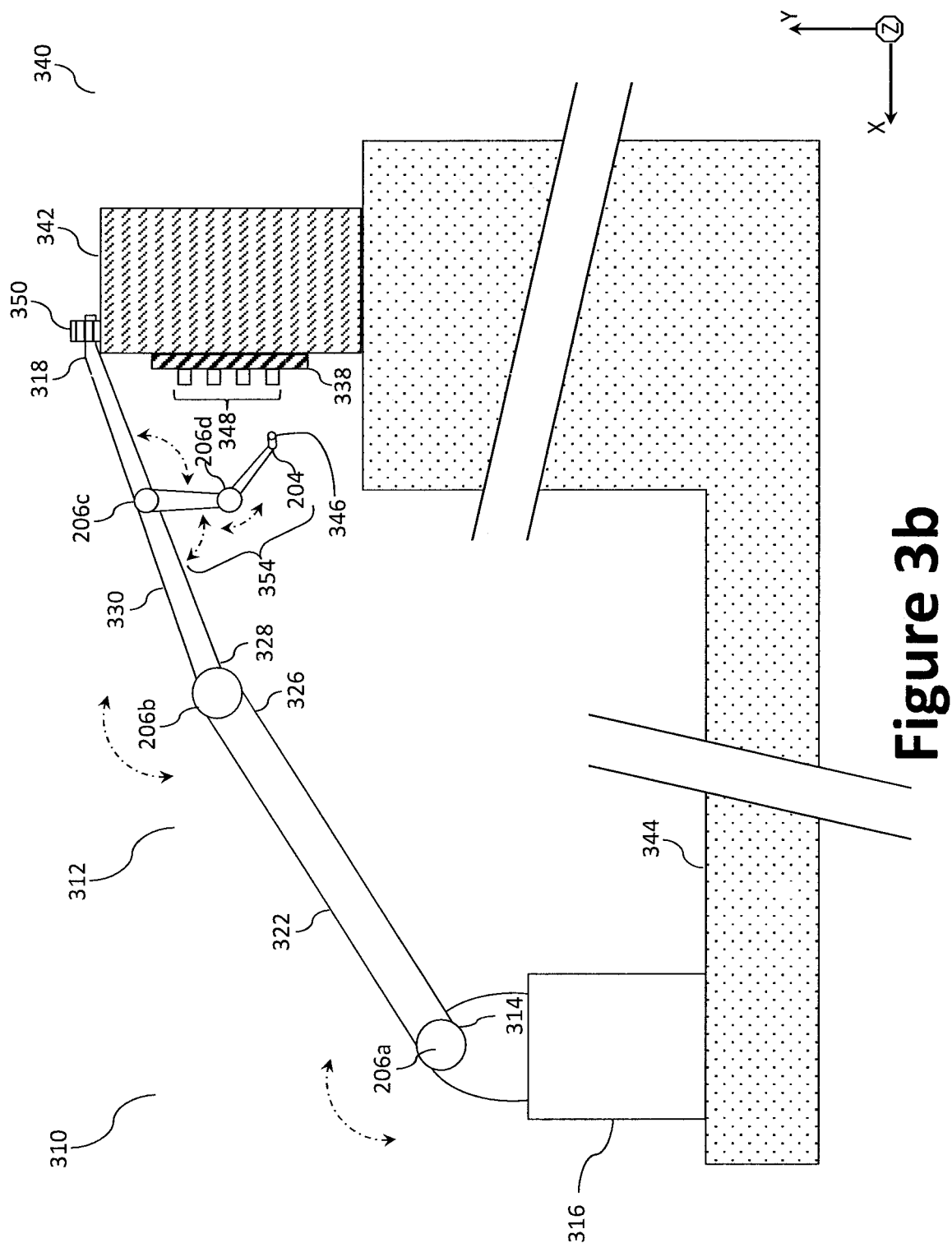

FIGS. 3a and 3b illustrate an exemplary method for controlling a manipulation system 310, such as the robotic manipulation system 100, in accordance with certain aspects of at least one embodiment. Referring to FIGS. 3a and 3b, a manipulation system 310 may employ a movable arm (e.g., an articulating arm 312, which man be similar to the articulating arm 202 of FIG. 2a) with a proximal end 314 (or first end) connected to a base 316 (e.g., a movable base 208) and a distal end 318 (or second end) movable relative to the base 316. An end-effector 204 may be connected at, or near, the distal end 318 of the articulating arm 312 for movement therewith.

In the illustrated embodiment, the articulating arm 312 includes a first member 322 having a first end 324 movably connected to the base 316 via a first joint 206a and a second end 326 movably connected to the first end 328 of a second member 330 via a second joint 206b. The first and second member 322, 330 may be linear, curved, angled, or a combination thereof. While the articulating arm 312 is illustrated as having only two members 322, 324, additional members may be provided to provide additional articulation points (e.g., joints). The end-effector 204 is in turn movably connected relative to the articulating arm 312 at or near to the second end 332 of the second member 330 via a third joint 206c. As illustrated, the end-effector 204 may be coupled to the second member 330 via an articulating appendage 354 (e.g., a smaller articulating arm). The articulating appendage 354 may comprise a first member 354a and a second member 354b, which are pivotally coupled to one another end-to-end via a fourth joint 206d. Like the articulating arm 202, the articulating appendage 354 can be equipped with one or more encoders 110 for each of its degrees of freedom to ensure exact positioning of the articulating appendage 354. The end-effector 204 may be positioned at an end of the second member 354b (e.g., at the distal end of the articulating appendage 354). As will be discussed below, rather than a gripper as described in connection with FIG. 2a, the end-effector 204 may be a rigid pointer with a contact tip 346.

One or more arm actuators 106a (not shown in FIGS. 3a and 3b) are configured to move the articulating arm 312, while one or more end-effector 204 actuators 106b (not shown) are configured to control an operation of the end-effector 204 and/or the articulating appendage 354, where applicable. The actuation controller 102, for example, is configured to control operation of the one or more arm actuators 106a and end-effector 204 actuators 106b to effect controlled movement of the articulating arm 312, the articulating appendage 354, and end-effector 204 (e.g., to selectively open/close a gripper).

The manipulation system 310 is configured to perform desired operations on a target object 336. In the illustrated embodiment, the target object 336 is illustrated as a keypad 338 that includes a plurality of buttons 348 that can be controlled (actuated) by the manipulation system 310. In operation, the actuation controller 102 controls the one or more arm actuators 106a to move the distal end 318 of the articulating arm 312 towards the target object 336 (e.g., keypad 338). The manipulation system 310 then seeks a nearby mechanical-grounding surface 344, or a stabilization object 340, to enhance the total structural loop of the articulating arm 312 and environment. In controlled environments, the stabilization object 340 may be selected by technicians during installation and programming of the manipulation system 310. The proper position of the manipulation system 310 with respect to the mechanical-grounding surface 344 and stabilization object 340 could be directly programmed as a kinematic position of the manipulation system 310. Alternatively, a desired stabilization object 340 could be identified by technicians by using visual fiducials (i.e., unique visual identifiers that are easily read by a robot vision system), or by programming a robots optical system to recognize a stabilization object 340. A manipulation system 310 may also autonomously search for stabilization objects 340 that could be used during manipulation tasks. The manipulation system 310 may use a combination of optical and/or tactile sensing (e.g., via cameras 108 and/or pressure sensors 112) to seek candidate stabilization objects 340 (e.g., rigid frame 342), and then verify that the selected/identified stabilization objects 340 are sufficiently robust.

The actuation controller 102 continues moving the articulating arm 312 toward the target object 336 until the distal end 318 of the articulating arm 312 moves into contact with a stabilization object 340 located proximate to the target object 336. In the illustrated embodiment, the stabilization object 340 comprises a rigid frame 342 that surrounds and is secured to the keypad 338. The rigid frame 342 in turn is secured to a mechanical-grounding surface 344, which in the context of an aircraft may be the airframe or portion of the flight deck. Likewise, the base 316 of the manipulation system 310 may be secured to the airframe, such that the manipulation system 310 and the rigid frame 342 share a common mechanical-grounding surface 344.

Once the distal end 318 of the articulating arm 312 is moved into contact with the stabilization object 340 (e.g., the rigid frame 342), the actuation controller 102 simultaneously controls the one or more arm actuators 106a and the end-effector 204 actuator 106b to maintain contact between the distal end 318 of the articulating arm 312 and the stabilization object 340, while operating the end-effector 204 to perform a desired operation at the target object 336 (e.g., press a button 348). Note that if the contact stabilization object 340 does not contain hooks or other grasping surfaces, then the actuation controller 102 may cause the articulating arm 202 to push into the stabilization object 340 in order to provide pre-loading force to ensure that contact is maintained in the event of turbulence disturbances that operate at a higher frequency than can be directly controlled by the manipulation system 310 that would disturb the articulating arm 202 away from the stabilization object 340. For example, a manipulation system 310 may have a feedback control bandwidth of 10 Hz, and turbulence may include frequency content in excess of 1 kHz. Preloading the articulating arm 202 into the stabilization object 340 can provide a degree of headroom to the actuation controller 102 without needing to directly track all of the turbulence content. Maintaining contact with stabilization object 340 can be measured using both force and position measurement of the arm. Position may be measured by internal position sensors of the robot and/or by an external optical system. For example, force may be measured by internal estimation of force either through joint torque sensing/estimation or strain gauge sensing in the structure. In another example, force may also be measured directly using force/pressure sensors in the end-effector. Alternatively, the stabilization object 340 might include hooks or other grasping surfaces. If available, the articulating arm 202 can insert itself into this hooks, or otherwise grasp features associated with the ground surface in order to maintain a steady position.

According to some embodiments, the desired operation may comprise manipulating a movable object at the target object 336. In certain embodiments, the movable object comprises at least one of a button, a lever, or a knob. For example, in the illustrated embodiment, the operation performed by the end-effector 204 may comprise manipulating (e.g., actuating) one or more buttons 348 (or other actuators) on the keypad 336 via a rigid pointer. A contact tip 346 may be provided at the distal end of the end-effector 204 (e.g., at the tip of the rigid pointer) to enhance contact with the button 348 and/or a display device. To increase friction and improve contact, the contact tip 346 may be fabricated using, for example, a rubber tip or coating. In certain aspects, the target object 336 may be a display device having a touch screen (i.e., a touch sensitive layer—such as a resistive or capacitive touch screen). Therefore, where a touch screen needs to be engaged, the contact tip 346 may be fabricated from conductive fiber material so as to interact with the touch screen.

As noted above, the manipulation system 310 may incorporate one or more pressure sensors 112. For example, one or more pressures sensors 112 (e.g., pressure transducers) may be configured to sense engagement between the distal end 318 of the articulating arm 312 and the stabilization object 340. For example, one or more pressure sensors 112 may be positioned on an underside surface of the distal end 318 of the articulating arm 312 to contact the mechanical-grounding surface 344 on approach to the target object 336. The actuation controller 102 may in turn rely on feedback from the pressure sensor 112 for controlling the arm actuator 106a to move the articulating arm 312 into contact with the stabilization object 340 and maintain such contact while operating the end-effector 204 to perform the desired operation at the target object 336.

Upon completing the desired operation at the target object 336, the actuation controller 102 may control one or more of the arm actuators 106a to disengage the distal end of the arm from contact with the stabilization object 340. In some embodiments a docking station 350 may be provided at the stabilization object 340. The docking station 350 may be configured to engage releasably with the distal end 318 of the articulation arm 312.

Figure 3C:
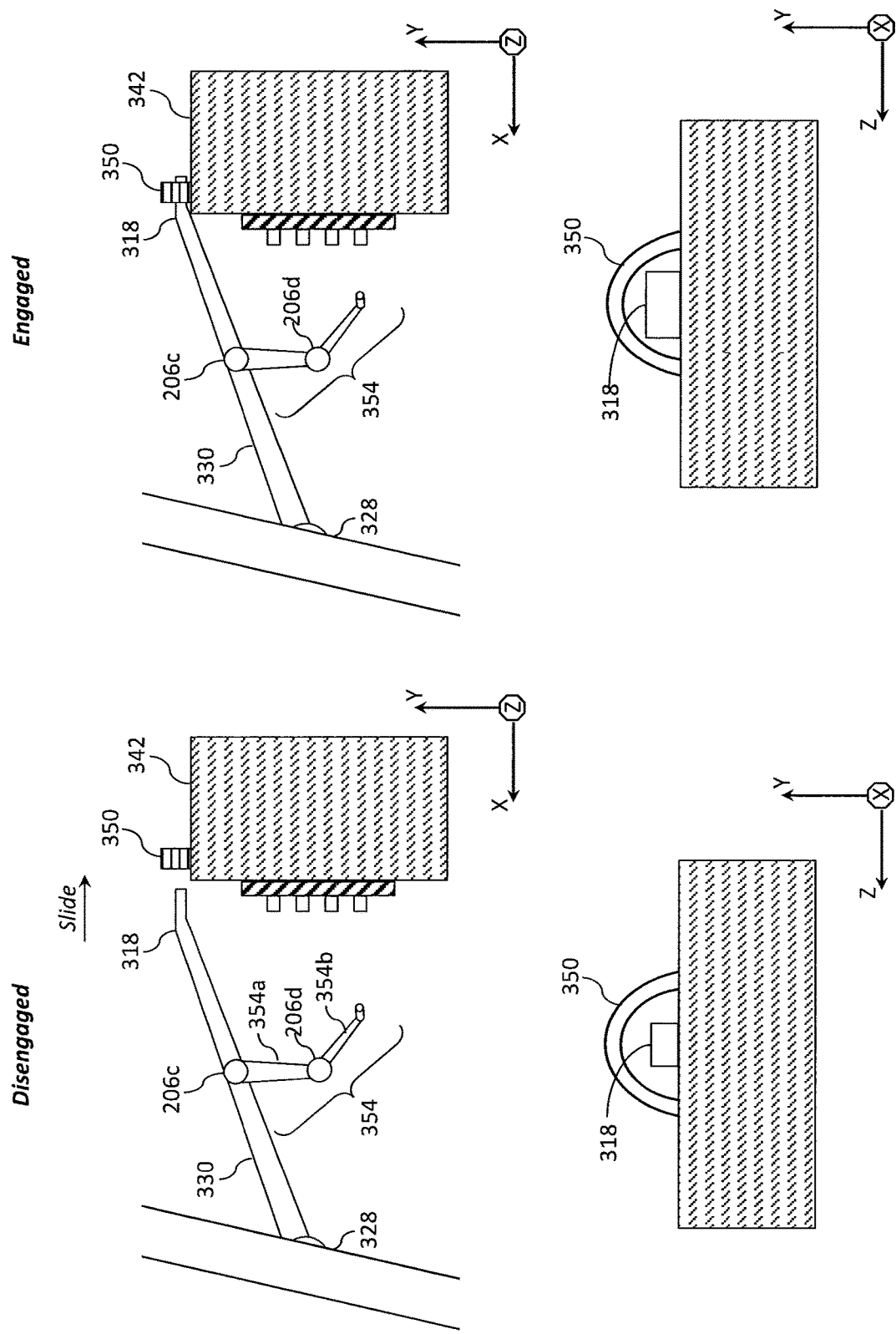
FIGS. 3c and 3d illustrate an example docking station.
Figure 3D:
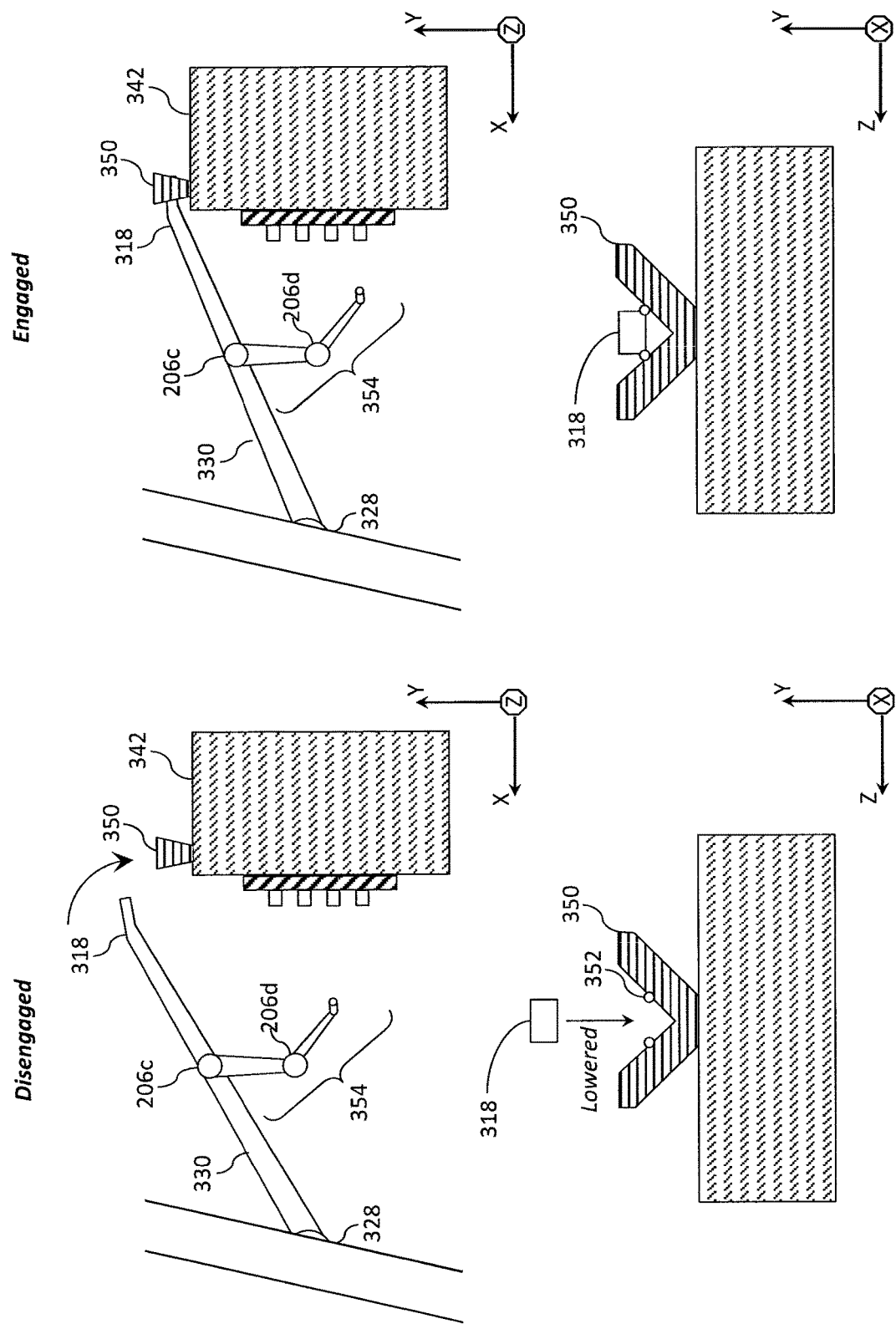

An example docking station 350 is illustrated in FIGS. 3c and 3d. In certain aspects, as best illustrated in FIG. 3c, the docking station 350 may be housing with a cavity (e.g., a loop) to receive the tip of the distal end 318 of the articulating arm 312 through a sliding motion. In another aspect, as best illustrated in FIG. 3d, the docking station 350 may be a U-shaped or forked metal connector within which the tip of the distal end 318 can be received. As illustrated, the articulating arm 312 may be pivoted (e.g., about the first end 328) and lowered into the fork of the docking station 350. One or more pads 352 may be positioned on an inner surface of the docking station 350 to mitigate vibration transfer between the docking station 350 and the distal end 318. In certain aspects, the docking station may employ a funnel shaped object to guide the robot to its final destination.

Figure 4:
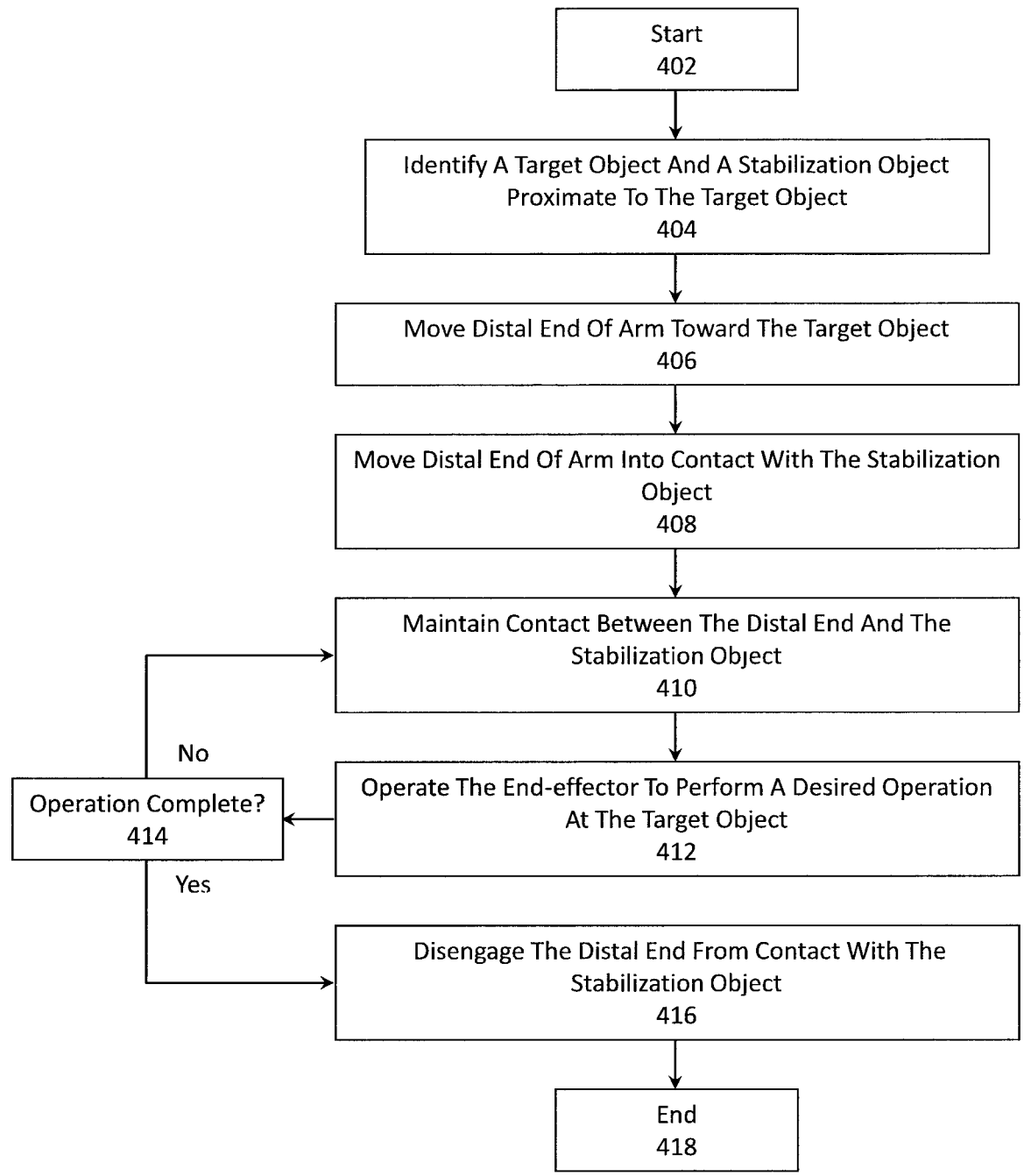
FIG. 4 illustrates a block diagram of an operating manipulation system having a movable arm.

FIG. 4 illustrates a method 400 of operating a manipulation system having a movable arm (e.g., an articulating arm, such as those illustrated in FIGS. 2a-2b and 3a-3d), such as the manipulation system 310; the movable arm having a proximal end connected to a base and a distal end that is movable relative to the base.

The process starts at step 402, which may be in response to an input from an operator or another device received via the actuation controller 102. The movable arm may include an end-effector at or near the distal end of the movable arm, where the end-effector may include an end-effector actuator configured to control an operation of the end-effector to perform a desired operation on a target object. The end-effector can be coupled to the movable arm such that it is movable relative to the movable arm. For example, the end-effector may be coupled to the movable arm via one or more actuator-controlled joints and/or arm segments, including, for example, a linear arm segment (e.g., the arm segment 220 of FIG. 2a), an articulating appendage (e.g., the articulating appendage 354 FIGS. 3a-3d), or the like.

At step 404, the manipulation system, under control of the processor (e.g., an actuation controller) identifies a target object and a stabilization object proximate to the target object via, for example, known coordinates in the environment (e.g., a cockpit) or a vision system (e.g., camera or other optical sensor). One or more fiducial markers may be provided in the environment to assist in tracking or locating the stabilization object and/or the target object.

At step 406, the manipulation system moves the distal end of movable arm toward the target object. At step 408, the manipulation system moves the distal end of movable arm into contact with the stabilization object. At step 410, the manipulation system maintains contact between the distal end and the stabilization object. At step 412, the manipulation system operates the end-effector to perform a desired operation at the target object. When the end-effector is coupled to the movable arm via an articulating appendage (or another movable appendage), the articulating appendage may be controlled to selectively contact the target object. For example, if the target object is a keypad, the articulating appendage may be controlled at step 412 to selectively actuate (e.g., press) one or more buttons of the keypad. Where a gripper is used, the gripper may be similarly be brought into contact with the target object and then used to engage and/or actuate the target object via one or more end-effector actuators (e.g., to open/close the gripper).

At step 414, the manipulation system determines whether the operation is complete. If the operation is not complete, the manipulation system continues to maintain contact between the distal end and the stabilization object (step 410) and continues to perform the operation (step 412). If the operation is complete, the process proceeds to step 416.

At step 416, the manipulation system disengages the distal end from contact with the stabilization object. At step 418, the process ends. In other words, the manipulation system maintains contact between the distal end of the movable arm and the stabilization object, while operating the end-effector to perform a desired operation at the target object and, upon completing the desired operation at the target object, disengages the distal end of the movable arm from contact with the stabilization object. In certain aspects, the manipulation system may releasably anchor the distal end of the moveable arm to the stabilization object while the end-effector performs a desired operation at the target object. The co-bot safety system, described above, may be implemented at virtually any point during the method 400 of FIG. 4 where the vibration (e.g., as determine using the accelerometers 114, for example) meets a predetermine threshold.

While FIGS. 2a and 2b and 3a-3d illustrate manipulation systems 100, 310 configured to operate aircraft controls and keypads, the disclosed systems and methods are suitable for a variety of robotic applications where vibrations may otherwise interfere with fine-manipulation by a robot. For example, the disclosed method is also suitable for use in applications where the robotic arm is affixed to a moving device, such as an unmanned aerial vehicles (UAV). To that end, an example multi-rotor vertical take-off and landing (VTOL) UAV 500 equipped with an aerial manipulation system 514 is illustrated in FIGS. 5a to 5b.

Figure 5A:
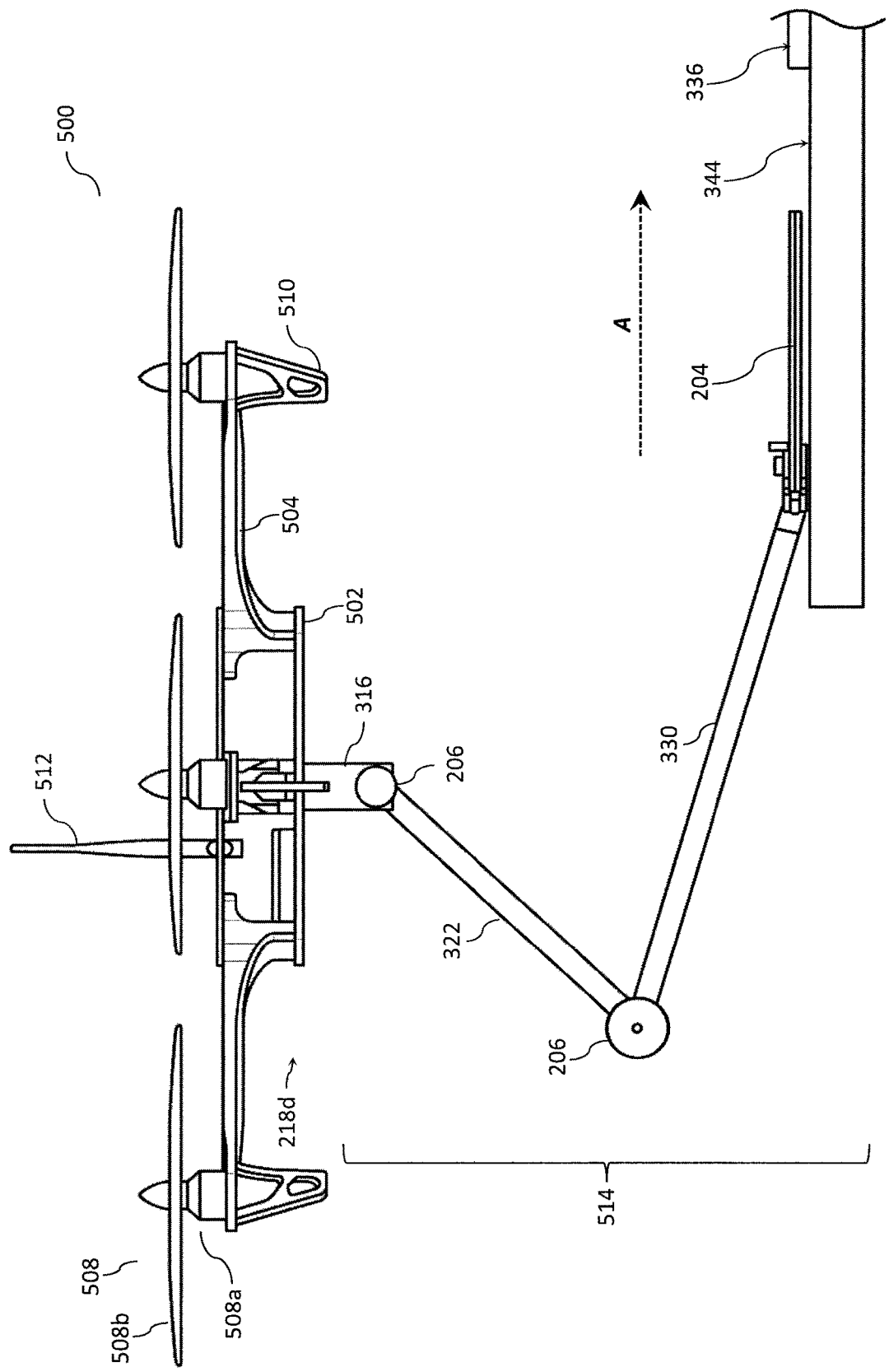
FIG. 5a illustrates an example multi-rotor vertical take-off and landing (VTOL) UAV equipped with a manipulation system.
Figure 5B:
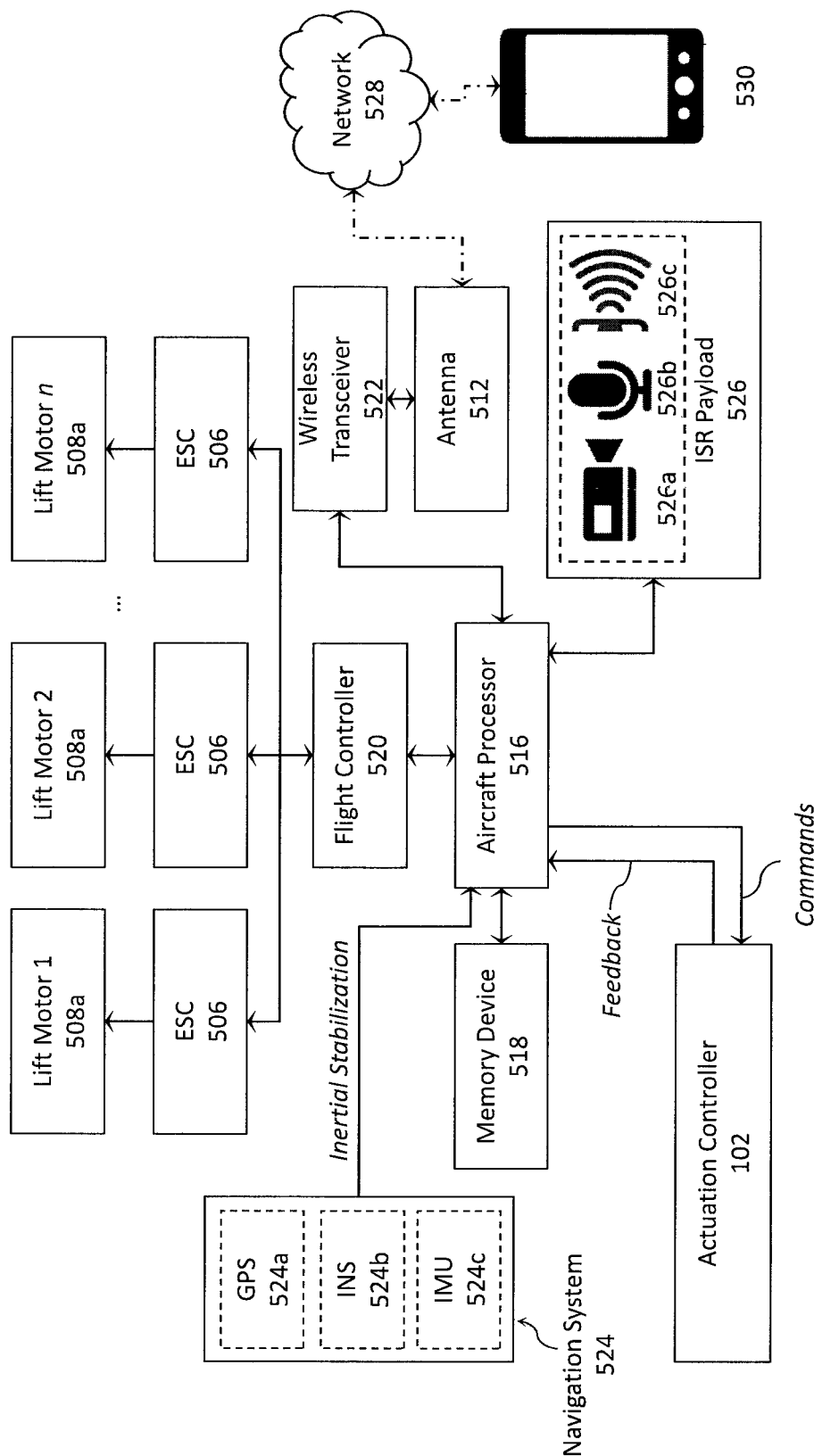

As illustrated in FIG. 5a, the UAV 500 generally comprises an airframe 502 (e.g., a fuselage or other structure), a plurality of rotor booms 504 (e.g., longitudinal booms) extending radially from the airframe 502, landing gear 510, and a plurality of propulsors 508. The airframe 502 may be coupled with a proximal end of each of the plurality of rotor booms 504 such that the distal ends of the plurality of rotor booms 504 extend radially from the airframe 502. The airframe 502 and the plurality of rotor booms 504 may be fabricated as a singular unit, or as separate components to be coupled to one another. The distal end of each of the plurality of rotor booms 504 may be coupled with a propulsor 508, each of which is illustrated as a lift motor 508a coupled to, and configured to drive/rotate, a propeller 508b. Each of said plurality of propulsors 508 is placed at a distal end of a rotor boom 504 and oriented to direct thrust downward (relative to the airframe 502). The lift motor 508a may be an electric motor controlled via an electronic speed controller (ESC) 506. To that end, an ESC 506 may also be provided, for example, adjacent the lift motor 508a and/or integrated (or otherwise coupled) at the distal end of a rotor boom 504. While the UAV 500 is illustrated as having six propulsors 508 (i.e., an hexa-rotor aircraft), a person of skill in the art would understand that additional, or fewer, propulsors 508 may be employed to achieve a desired function and depending on, for example, thrust requirements. To prevent mechanical interference with the aerial manipulation system 514, the landing gear 510 may employ a plurality of posts positioned along the perimeter of the UAV 500 (e.g., at the distal end of each boom 504). The posts of landing gear 510 and the plurality of rotor booms 504 may be fabricated as a singular unit, or as separate components to be coupled to one another.

FIG. 5a illustrates the aerial manipulation system 514 in an extended position. The aerial manipulation system 514 generally comprises an end-effector 204 coupled to a base 316 via a first member 322 and a second member 330. As illustrated, the aerial manipulation system 514 may be rotatably and pivotally coupled to the UAV 500 via the base 316, which is coupled to the underside surface of the airframe 502. The base 316 may be fixed or configured to rotate relative to the airframe 502 (e.g., about an axis that is perpendicular to the X-Y plane). The base 316 may be, for example, a gimbal system or a U-shaped bracket.

As discussed with regard to FIGS. 3a through 3d, the endpoint-accuracy of the aerial manipulation system 514 can be greatly enhanced through contact between the end-effector 204 and the mechanical-grounding surface 344. For example, consider a target object 336 that is resting on a flat mechanical-grounding surface 344. Placing the end-effector 204 directly onto the target object 336 would require accurate positioning in six axes—three Cartesian and three rotational. The aerial manipulation system 514, on the other hand, can explicitly contact the mechanical-grounding surface 344 before approaching the target object 336, thereby using the mechanical-grounding surface 344 to orient and stabilize three of the end-effector's degrees of freedom (i.e., vertical displacement and two rotational degrees of freedom). Active feedback control can also be used to ensure constant contact with the mechanical-grounding surface 344 as the UAV 500 moves the final centimeters (identified as Direction A) towards the target object 336. Therefore, the aerial manipulation system 514 can move an end-effector 204 relative to the UAV 500 and toward (e.g., by sliding) the target object 336 along a mechanical-grounding surface 344 (e.g., a table, or other static mechanical surface).

In other words, the UAV 500 can use the mechanical-grounding surface 344 to slide the end-effector 204 as it travels toward the target object 336 (identified as Direction A) to perform millimeter-accurate pick-up operation. The UAV 500 may travel toward the target object 336 until it is within the end-effector's 320 envelope. While the mechanical-grounding surface 344 is illustrated as large with initial touch-down point being relatively far from the target object 336, the endpoint can be configured to touch down within a short distance (e.g., a 2-10 centimeters, or directly on top) of the target object 336 using, inter alia, visual positioning and AR Tags. In this example, the UAV 500 uses a horizontal mechanical-grounding surface 344 to orient itself, but any mechanical-grounding surface 344 in any orientation could be used, such as a vertical wall near the target object 336. In fact, the target object 336 itself could also be used as the mechanical-grounding surface 344 if it is properly constrained.

FIG. 5b illustrates a block diagram of an example aircraft control system for the UAV 500, which may be configured to control the various aircraft components and functions of the UAV 500. As illustrated, the UAV 500 includes one or more aircraft processors 516 communicatively coupled with at least one memory device 518, an actuation controller 102 of the aerial manipulation system 514, a flight controller 520, a wireless transceiver 522, and a navigation system 524. The aircraft processor 516 may be configured to perform one or more operations based at least in part on instructions (e.g., software) and one or more databases stored to the memory device 518 (e.g., hard drive, flash memory, or the like).

The aircraft control system may further include other desired services, such as a wireless transceiver 522 coupled with an antenna 512 to communicate data between the UAV 500 and a remote device 530 (e.g., portable electronic devices, such as smartphones, tablets, and laptop computers) or other controller (e.g., a base station). For example, the UAV 500 may communicate data (processed data, unprocessed data, etc.) with the remote device 530 over a network 528. In certain aspects, the wireless transceiver 522 may be configured to communicate using one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), Wi-Fi (e.g., Institute of Electrical and Electronics Engineers' (IEEE) 802.11 standards), etc. The remote device 530 may facilitate monitoring and/or control of the UAV 500 and its payload(s), including the aerial manipulation system 514 and ISR payload 526.

The aircraft processor 516 may be operatively coupled to the flight controller 520 to control operation of the various actuators (e.g., those to control movement of any flight surfaces) and/or lift motor 508a (e.g., via ESC 506) in response to commands from an operator, autopilot, a navigation system 524, or other high-level system via the wireless transceiver 522. In certain aspects, the aircraft processor 516 and the flight controller 520 may be integrated into a single component or circuit. The aircraft processor 516 may be operatively coupled to the navigation system 524, which may include a global positioning system (GPS) 124a that is communicatively coupled with an Inertial Navigation System (INS) 124b and/or an inertial measurement unit (IMU) 124c, which can include one or more gyros and accelerometers. The GPS 124a gives an absolute drift-free position value that can be used to reset the INS solution or can be blended with it by use of a mathematical algorithm, such as a Kalman Filter. The navigation system 524 may communicate, inter alia, inertial stabilization data to the aircraft processor 516, which may be used to facilitate operation of the aerial manipulation system 514.

To collect data and/or monitor an area, the UAV 500 may further be equipped with an intelligence, surveillance, and reconnaissance (ISR) payload 526 comprising, for example, one or more cameras 526a (e.g., an optical instrument for recording or capturing images and/or video, including light detection and ranging (LIDAR) devices), audio devices 526b (e.g., microphones, echolocation sensors, etc.), and other sensors 526c to facilitated ISR functionality and provide ISR data (e.g., photographs, video, audio, sensor measurements, etc.). The ISR payload 526 is operatively coupled to the aircraft processor 516 to facilitate communication of the ISR data between the ISR payload 526 and the aircraft processor 516. The ISR data may be used to navigate the UAV 500 and/or control operation of the aerial manipulation system 514. The ISR data may be dynamically or periodically communicated from the UAV 500 to the remote device 530 over the network 528 via the wireless transceiver 522, or stored to the memory device 518 for later access or processing. The aircraft processor 516 may be operatively coupled with the manipulation system's 514 actuation controller 102 to provide two-way communication between the aerial manipulation system 514 (e.g., its processor and/or sensors) and the aircraft processor 516. For example, commands may be communicated to the aerial manipulation system 514 from the aircraft processor 516 based at least in part on commands from an operator, autopilot, the navigation system 524, the ISR payload 526, or other high-level systems.

The above-cited patents and patent publications are hereby incorporated by reference in their entirety. Where a definition or the usage of a term in a reference that is incorporated by reference herein is inconsistent or contrary to the definition or understanding of that term as provided herein, the meaning of the term provided herein governs and the definition of that term in the reference does not necessarily apply. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the teachings of the subject disclosure may therefore be practiced otherwise than as specifically described above.

What is claimed is:

1. A method of operating a manipulation system having a movable arm, the movable arm having a proximal end connected to a base and a distal end that is movable relative to the base, the movable arm being coupled to an end-effector, the method comprising:
moving the distal end of the movable arm towards a target object and into contact with a stabilization object proximate to the target object;
maintaining contact between the distal end of the movable arm and the stabilization object, while operating the end-effector to perform a desired operation at the target object; and
upon completing the desired operation at the target object, disengaging the distal end of the movable arm from contact with the stabilization object.

2. The method of claim 1, wherein the movable arm is an articulating arm having at least two linkages that are movably connected to one another via a joint.

3. The method of claim 1, wherein the end-effector is movably coupled to the movable arm via an articulating appendage.

4. The method of claim 1, wherein the desired operation comprises manipulating a movable object at the target object.

5. The method of claim 4, wherein the movable object is a flight controller in a cockpit having at least one of a button, a lever, or a knob.

6. The method of claim 1, further comprising the step of sensing an engagement pressure between the distal end of the movable arm and the stabilization object.

7. The method of claim 1, further comprising the step of providing a docking station at the stabilization object, the docking station being configured to engage releasably with the distal end of the movable arm.

8. The method of claim 7, wherein the docking station comprises a funnel shaped object configured to receive the distal end releasably.

9. The method of claim 1, wherein the stabilization object is fixed against movement relative to the target object.

10. The method of claim 9, wherein the stabilization object is physically connected with the target object.

11. The method of claim 10, further comprising the step of distinguishing vibration imparted to the manipulation system via the base from vibration originating from other parts of the manipulation system based at least in part on accelerometer data from one or more accelerometers placed on the manipulation system.

12. The method of claim 1, wherein the stabilization object and the base are both physically connected to a surface in a cockpit or an aircraft frame.

13. The method of claim 12, wherein the stabilization object is physically connected to the target object.

14. A method of improving a pointing-accuracy of a manipulation system installed on a vibrating surface, the manipulation system comprising a movable arm having a proximal end connected to a base and a distal end movable relative to the base, one or more arm actuators configured to move the movable arm relative to the base, an end-effector coupled to the movable arm, an end-effector actuator configured to control an operation of the end-effector to perform a desired operation on a target object, the base and the target object fixed to the vibrating surface such that they are caused to vibrate by the vibrating surface, and a processor configured to control operation of the end-effector actuator and the one or more arm actuators, the method comprising:
controlling the one or more arm actuators, via the processor, to move the distal end of the movable arm towards a target object and into contact with a stabilization object located proximate to the target object to mechanically-ground the distal end to the stabilization object, wherein the stabilization object is fixed against vibration relative to the target object;
controlling the one or more arm actuators and the end-effector actuator, via the processor, to maintain contact between the distal end of the movable arm and the stabilization object while operating the end-effector to perform a desired operation at the target object; and
upon completing the desired operation at the target object, controlling the one or more arm actuators, via the processor, to disengage the distal end of the movable arm from contact with the stabilization object.

15. A manipulation system comprising:
a movable arm having a proximal end connected to a base and a distal end movable relative to the base;
one or more arm actuators configured to move the movable arm relative to the base;
an end-effector in connection with the moveable arm via an articulating arm linked to the moveable arm;
an end-effector actuator configured to control an operation of the end-effector to perform a desired operation on a target object; and
a processor configured to control operation of the end-effector actuator and the one or more arm actuators, the processor further configured to:
control the one or more arm actuators to move the distal end of the movable arm towards a target object and into contact with a stabilization object located proximate to the target object;
control the one or more arm actuators and the end-effector actuator to maintain contact between the distal end of the movable arm and the stabilization object while operating the end-effector to perform a desired operation at the target object; and
control the one or more arm actuators, upon completing the desired operation at the target object, to disengage the distal end of the movable arm from contact with the stabilization object.

16. The manipulation system of claim 15, wherein the processor is further configured to releasably anchor the distal end of the moveable arm to the stabilization object while the end-effector performs a desired operation at the target object.

17. The manipulation system of claim 16, wherein the movable object is a flight controller in a cockpit having at least one of a button, a lever, or a knob.

18. The manipulation system of claim 15, further comprising a pressure sensor configured to sense an engagement pressure between the distal end of the moveable arm and the stabilization object.

19. The manipulation system of claim 15, wherein the stabilization object is fixed against movement relative to the target object.

20. The manipulation system of claim 15, wherein the stabilization object and the base are both physically connected to a surface in a cockpit or an aircraft frame.

21. The manipulation system of claim 15, wherein the base comprises one or more accelerometers.

* * * * *